United States Patent [19]

Kawakami

[11] Patent Number: 4,657,625
[45] Date of Patent: Apr. 14, 1987

[54] APPARATUS FOR PRODUCING SHEET HAVING MANY HOLLOW BODIES FROM THERMOPLASTIC MATERIAL

[75] Inventor: Hajime Kawakami, Nagoya, Japan

[73] Assignee: Kawakami Sangyo Kabushki Kaisha, Nagoya, Japan

[21] Appl. No.: 745,159

[22] Filed: Jun. 17, 1985

[30] Foreign Application Priority Data

Jun. 20, 1984 [JP] Japan ................. 59-125099

[51] Int. Cl.⁴ ............... B32B 31/00; B31F 1/00
[52] U.S. Cl. .................. 156/471; 100/93 RP;
156/145; 156/244.14; 156/244.21; 156/244.23;
156/498; 156/582; 156/583.1; 264/511;
264/514; 264/515; 264/568; 425/336
[58] Field of Search ............ 156/471, 472, 497, 498,
156/582, 583.1, 244.11, 244.13, 244.14, 244.21,
244.24, 145, 244.23; 100/93 RP; 425/336;
264/284, 511, 514, 515, 568

[56] References Cited

U.S. PATENT DOCUMENTS

| | | | |
|---|---|---|---|
| 3,185,816 | 5/1965 | Lusebrink | 100/93 RP |
| 3,227,857 | 1/1966 | Hill et al. | 100/93 RP |
| 3,416,984 | 12/1968 | Chavannes et al. | 156/498 |
| 3,756,884 | 9/1973 | Hagino | 156/471 |
| 4,427,474 | 1/1984 | Ottaviano | 156/471 |

Primary Examiner—Jay H. Woo
Assistant Examiner—Timothy W. Heitbrink
Attorney, Agent, or Firm—Armstrong, Nikaido, Marmelstein & Kubovcik

[57] ABSTRACT

An apparatus for producing a sheet having many hollow bodies from thermoplastic material such as polyethylene, used for cushioning and insulation, is disclosed. Film extruded from a T die, after being cooled, is heated by an induction heating roller with a jacket and inner cooling means.

The induction heating roller with a jacket and inner cooling means has, along with the jacket within a roller-shell, an induction coil for heating, and a hermetically sealed heat transfer medium between the jacket and the induction coil. The characteristic feature of the present invention is a cooling means provided to cool the heat transfer medium, with advantages of rapid temperature rise and fall, and uniform temperature distribution on the circumference and longitudinal axis of the roller.

Using this apparatus, a sheet having many hollow bodies, with high transparency and high product yield without defects such as partial inferior fusing, can be produced.

3 Claims, 5 Drawing Figures

APPARATUS FOR PRODUCING SHEET HAVING MANY HOLLOW BODIES FROM THERMOPLASTIC MATERIAL

BACKGROUND OF THE INVENTION

1. Field of the Invention

The present invention relates to an improved apparatus for producing a sheet having many separate hermetically sealed hollow bodies from thermoplastic material such as low density polyethylene film.

2. State of the Art

Thermoplastic sheeting having many hollow bodies is used for such purposes as cushioning and insulation, under such names as "air cap" and "bubble pack".

In general, as shown in FIGS. 4A and 4B, this sheet is formed by heat fusing plastic film 2 (hereinafter referred to as "capfilm") having projections 2a, with flat plastic film 3 (hereinafter referred to as "backfilm"), to hermetically seal the open side of the capfilm and form cavity 4. There are some variations such as with an additional plastic film or other materials fused to the top of the projection of capfilm 2 for a three-layered product, or laminates with different materials such as paper.

The known art of producing the above-mentioned sheet having many hollow bodies is divided into the following three types. With the first type, plastic material is extruded from a die as a film and the capfilm is formed while in a plastic state. This capfilm comes into contact with a backfilm also extruded from a die, and the layers are fused by applying pressure. With the second type, plastic material is temporarily wound as rolled material, unwound and heated to a plastic state at a suitable temperature, and the above-mentioned forming and heat fusing are carried out. And with the third type, plastic material is extruded, heated to a plastic state immediately after rapid cooling, and the above-mentioned forming and heat fusing are carried out.

A disadvantage of the art of the first type is the loss of transparency as crystallization of the plastic material advances due to the backfilm being held at a high temperature for a long time. And compared to when the film is immediately cooled after being formed, there is another problem with low rigidity of the capfilm. Furthermore, creasing of the backfilm is easily created because it cannot be heat fused.

The offline production method of type 2 is inferior to the inline production method of type 1, from a cost point of view, but has the advantage of using simple facilities because it is possible to use rolled film that is easily procured. Among problems accompanying this technique are changes in the physical properties and surface condition of the film when crystallization of the plastic material and blooming of additives advances during storage. Because the physical properties of the plastic material are different depending on length of time and conditions under which it is stored, maintaining uniform quality of the product is difficult.

The method of type 3 appeared, in order to maintain the advantages of the inline method over the offline method and eliminate the above-mentioned weaknesses. Plastic material extruded from a die as a film is used after immediate rapid cooling and reheating, and along with being able to avoid opacity, a rigid, high-quality, uniform sheet with no creasing can be produced.

However, the method of type 3 is not necessarily easily put into practice. With conventional apparatus, temperature along the axis of the film heating roller and responsiveness to temperature are unsatisfactory, and maintenance is also troublesome.

Among heating means for the roller the easiest to use is an electric heater, but temperature uniformity along the axis of the roller is not good. Much time and trouble are required when the heater fails and has to be replaced. Although temperature rise is comparatively rapid, temperature fall must wait for heat radiation.

At factories with steam facilities, steam is also an effective heating means, raising temperature uniformity along the axis of the roller. But changes in the established temperature, which are dependent on regulation of steam pressure, are not rapid.

Circulation of a heat transfer medium is being used in place of steam to increase temperature responsiveness. Cooling the heat transfer medium at the outer portion of the roller can improve the rate of temperature fall, but temperature rise is not very rapid, and temperature uniformity along the axis is inferior to steam heating. With the intention of raising temperature uniformity along the axis, a jacket provided within the roller was conceived, enclosing a gas-liquid, two-phase mixture system, and having the advantage of being nearly maintenance-free. A coil is also provided within the roller, making possible a rapid temperature rise by heating through induction. However, temperature responsiveness is still insufficient because temperature fall requires time.

In addition, temperature distribution along the axis of the heating roller with a width of 1200 mm is generally ±5° C., so that the temperature distribution along the width of the plastic film is not uniform, resulting in partial inferior forming or incomplete fusing. Particularly, the latter occurs easily. When using a certain kind of polyethylene as a representative plastic material for producing bubble pack, it is necessary to maintain the plastic film within a temperature range of 142° C. to 144° C. Temperatures of about 146° C. and above cause adhesion to the heating roller. At temperatures of about 140° C. and below, fusing is inferior. Accordingly, difficulties exist in producing, with a high yield, a wide range of products using an existing apparatus. This tendency is all the more evident when the intention is to obtain a lighter weight, flexible, low-priced product using a thin film.

SUMMARY OF THE INVENTION

The present invention was proposed to solve the previously mentioned problems.

The object of the present invention is to provide an apparatus for producing bubble pack, with high yield and efficiency, from various materials, using films of various sizes, requiring no special skill, and especially for producing a product that has improved transparency and rigidity, and that avoids the occurrence of backfilm creasing.

With an apparatus for producing a sheet having many hollow bodies from plastic material, a plastic film from a first supply source is sent between two rollers facing each other, one of which has a series of indentations, and along with the formation of projections through vacuum suction, this plastic film is fused to a flat plastic film from a second film source. The apparatus for producing a sheet having many separate hermetically sealed hollow bodies of the present invention comprises induction heating rollers each having a jacket and inner cooling means positioned between the above-mentioned rollers and the above-mentioned first and second film supply sources, and a cooling roller, positioned between the induction heating roller with inner cooling means and each of the above-mentioned first and second supply sources. This induction heating roller with a jacket and inner cooling means has a roller shell, inside of which is a heat transfer medium, hermetically sealed in the space between the jacket and an induction coil used for heating. The characteristic feature of the present invention is the means for cooling this heat transfer medium.

Capfilm from the first film supply source is fed, at an appropriate temperature uniformly maintained across the width of the film, to the forming roller, via the cooling roller, by the induction heating roller with a jacket and inner cooling means, to form the projections. Meanwhile, backfilm from the second film supply source is also fed, at an appropriate temperature uniformly maintained across the width of the film, via the cooling roller, to the forming roller, by the induction heating roller with a jacket and inner cooling means. The backfilm comes into contact with, and is fused under pressure to, the capfilm having projections, forming the above-mentioned hollow bodies.

DRAWINGS

DETAILED EXPLANATION OF PREFERRED EMBODIMENTS

Embodiments of the present invention will be explained below, with reference to the Drawings.

Figure 1:
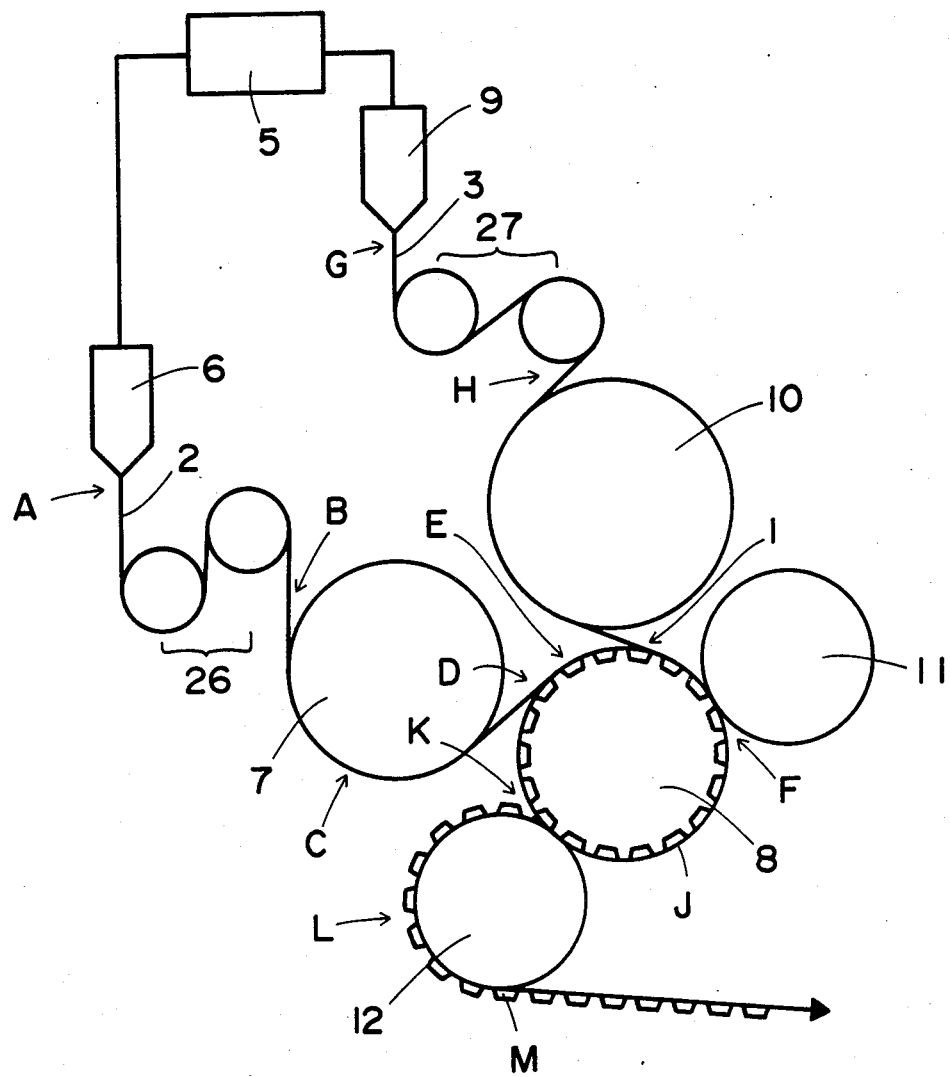
FIG. 1 is a conceptual drawing showing the components of the apparatus of the present invention.

As shown in FIG. 1, capfilm 2, supplied from extruder 5 through the first film supply source T die 6, is cooled by cooling roller 26, preferably by rapid cooling, comes into contact with induction heating roller 7 having a jacket and inner cooling means, on which the capfilm is heated to an appropriate temperature, and contacts forming roller 8. Projections 2a are vacuum formed by the indentations provided around the circumference of formimg roller 8. At the same time, backfilm 3, supplied from extruder 5 through the second film supply source T die 9, is cooled by cooling roller 27, preferably by rapid cooling, comes into contact with induction heating roller 10 having a jacket and inner cooling means, on which the backfilm is heated to an appropriate temperature, and is fed to forming roller 8. The open side of projections 2a of capfilm 2 is closed. At this time, pressure is applied to both films by pressure roller 11, they are heat fused, and bubble pack 1 having hermetically sealed bodies 4 is formed. The bubble pack is peeled away by peeling roller 12 and reeled up.

Transparency is improved by cooling capfilm 2 and backfilm 3.

Figure 2:
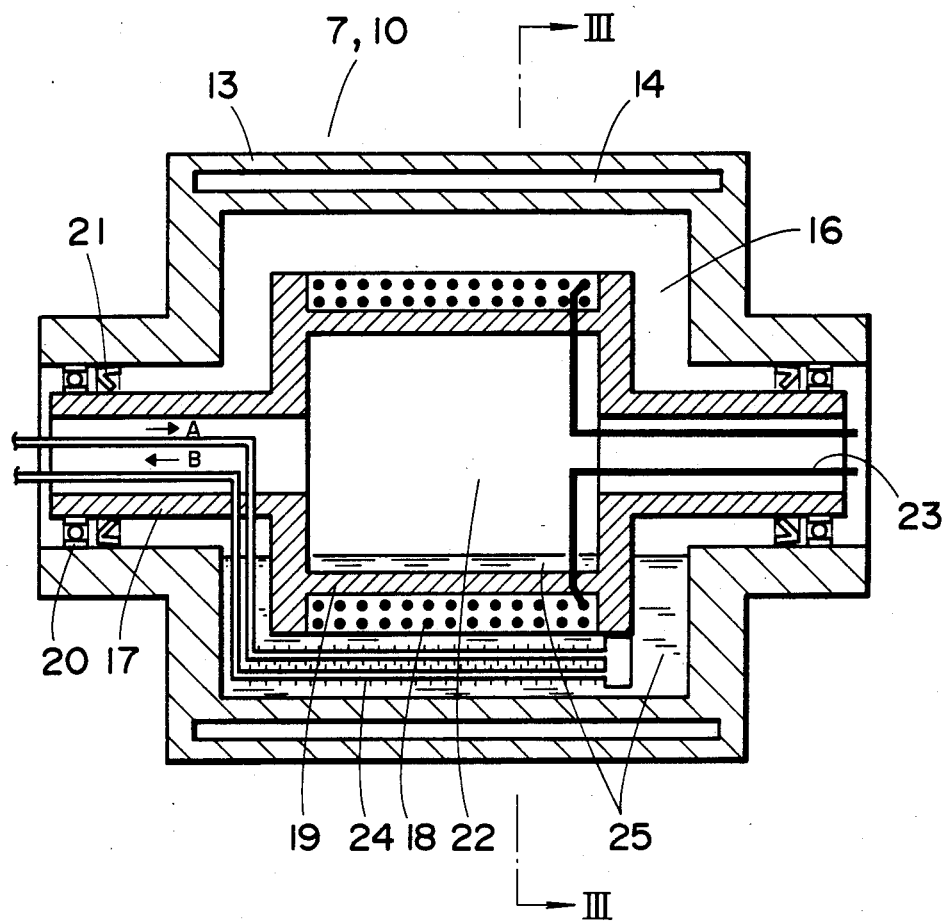
FIG. 2 is a vertical section of the induction heating roller with a jacket and inner heating means used with the apparatus of the present invention.
Figure 3:
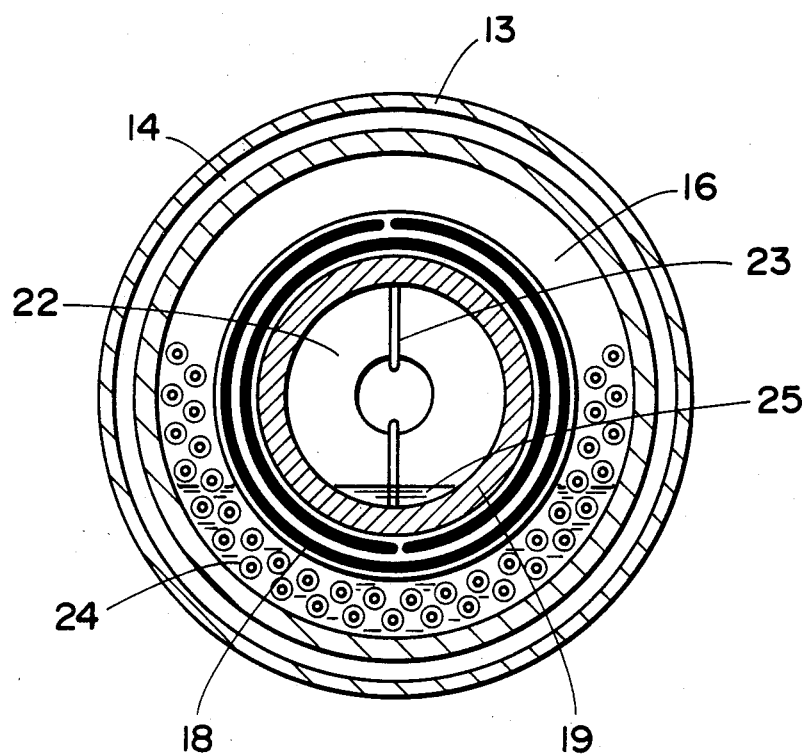
FIG. 3 is sectional view taken on line III—III of FIG. 2.
Figure 4A:
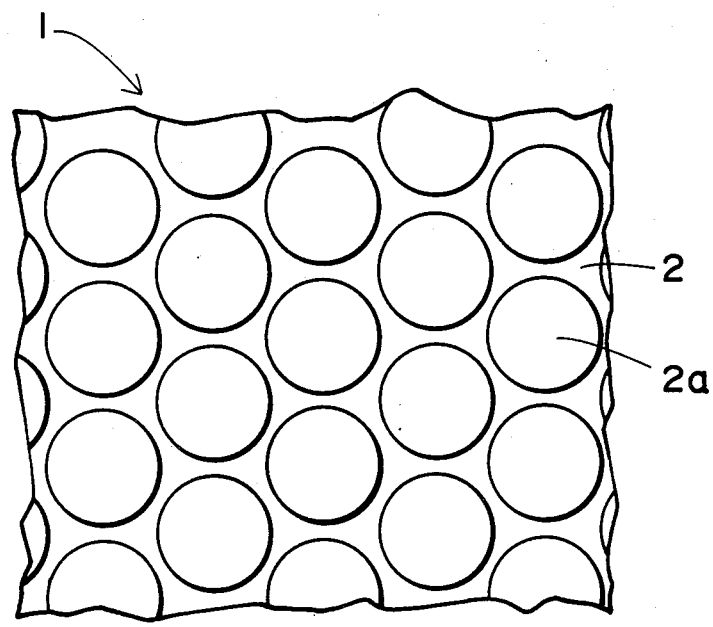
FIG. 4 shows the sheet having many hollow bodies made from thermoplastic material, A being a plan view, and B a sectional view.
Figure 4B:
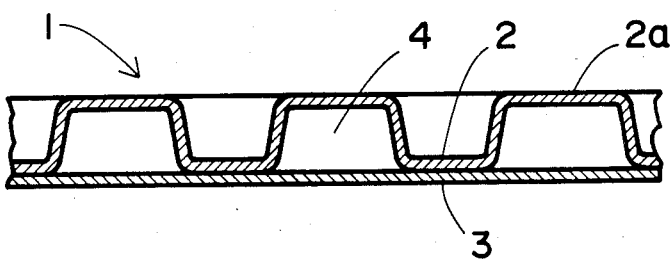

The construction of induction heating roller 7(10) having a jacket and inner cooling means, as shown in FIGS. 2 and 3, will now be explained.

Jacket 14 is formed in a circumferential grooved shape, in the thick portion near the peripheral surface of roller shell 13 located at the outer perimeter of induction heating roller 7(10). A heat transfer medium (not shown in the Figures) is enclosed within jacket 14, in a gas-liquid, two-phase state, and water under reduced pressure is used as the medium in the present example.

Fixed spindle 17 is internally provided at the center of roller shell 13. Induction coil 18, and core 19 for support, are provided at the center of fixed spindle 17. Hermetically sealed chamber 16 is formed between induction coil 18 and roller shell 13. Roller shell 13 is supported at both ends of fixed spindle 17 by bearings 20. Sealing material 21 is inserted between hermetically sealed chamber 16 and bearings 20, thereby isolating hermetically sealed chamber 16 from the open air.

Hermetically sealed chamber 22 is formed inside of core 19, and lead wire 23 is provided inside this chamber to supply electricity to induction coil 18. Lead wire 23 passes through fixed spindle 17 and is connected to an electrical power source not shown in the Figures.

The cooling means is formed by many pipes 24 with fins, arranged within hermetically sealed chamber 16, and by cooling medium supply source and cooling medium circulation means, both of which are not shown in the Figures. Circulatory supply of the cooling medium (for example, water) is continuously carried out, as shown by arrows A and B. Heat transfer medium 25 (for example, silicone oil) is stored in hermetically sealed chambers 16 and 22.

Induction heating roller 7(10) having a jacket and inner cooling means is used as follows. Alternating electric current is introduced through lead wire 23, and magnetic flux is created in induction coil 18, generating an eddy current in roller shell 13, which reaches a high temperature through Joule heating. As a result, the water within jacket 14 is heated by absorbing the heat from roller shell 13, and evaporates. The evaporated water flows to the portion of the jacket with a lower temperature, where the pressure is lower, and condenses to heat said portion. The surface temperature of roller shell 13 is uniformly maintained circumferentially and along the axis through repetition of the above steps.

Meanwhile, silicone oil 25 is continuously cooled, and along with avoiding excess temperature rise within, induction coil 18 controls voltage by, for example, PID control. In this way, extremely simple and rapid temperature rise and fall is realized.

It is possible to maintain, at an appropriate temperature, the plastic film contacting induction heating roller 7(10) having a jacket and inner cooling means because rapid temperature fluctuations and uniformity of temperature distribution can be obtained. In the Example, a temperature fluctuation rate of 0.8 min/°C. was achieved, and a temperature uniformity of ±1° C. along the 1200 mm long axis was confirmed.

Regulation of the flow and temperature of the water for the above-mentioned cooling means is unnecessary, and is conveniently left to the circulation of running water.

Capfilm 2 and backfilm 3 from T dies 6 and 9, respectively, after cooling, are maintained at the most suitable temperature by induction heating rollers 7 and 10, each having a jacket and inner cooling means. Because of the above-mentioned rapid temperature fluctuation rate of 0.8 min/°C., even if changes in the thickness of the film occur the problem can be quickly overcome, and because changes in the surrounding temperature occur rapidly, product yield is improved. The range of possible heat fusing temperatures is narrow because of the ±1° C. uniformity of temperature along the 1200 mm axis. Accordingly, even such a material of which the difference between the highest peelable temperature and the lowest fusable temperature is small can easily be used. Moreover, the formation of creases is eliminated and transparency is improved by maintaining backfilm 3 at the low temperature limit for heat fusing when the backfilm is inserted into the roller. Also, temperature control is simple because it can be performed by using only PID control with constant flow of the cooling water. Therefore, a high degree of skill in operation is unnecessary, with the additional possibility of unattended operation through automatic control.

EXAMPLE

Using an apparatus of the above-mentioned construction fitted with two 400 mm in diameter induction heating rollers each having a jacket and inner cooling means, a sheet having many hollow bodies was produced from polyethylene. Capfilm thickness was 80μ, and backfilm thickness was 40μ.

Temperature change at every point of the apparatus shown in FIG. 1 is given below. Line speed was 40 m/minute.

| POINT | CAPFILM | BACKFILM |
| --- | --- | --- |
| A, G | 250° C. | 250° C. |
| B | 50 | |
| H | | 50 |
| C | 138 | |
| D | 123 | |
| E | 93 | |
| I | | 130 |
| F | | 120 |
| J | 115 | |
| K | 75 | |
| L | 54 | |
| M | 40 | |

I claim:
1. An apparatus for producing a sheet having many seperate hermetically sealed hollow bodies therein, said apparatus comprising a first film supply means for supplying a first plastic film; a second film supply means for supplying a slat plastic film; two roller means for receiving the first plastic film and the flat plastic film therebetween and for fusing thereof, one of the roller means having a series of indentations and suction means for forming projecting by vacuum suction in the first plastic film; two induction heating roller means respectively positioned between the first and second film supply means and one of each of the two roller means; and two cooling roller means respectively positioned between the first and second film supply means and one of the two induction heating roller means; each induction heating roller means having a roller shell, a jacket under the roller shell, an induction coil for heating the roller shell and jacket, a heat transfer medium hermetically sealed between the jacket and the induction coil, and a cooling means for cooling the heat transfer medium.

2. The apparatus of claim 1, wherein water is enclosed within the jacket, at reduced pressure, and the heat transfer medium is silicone oil.

3. The apparatus of claim 1, wherein the cooling means for the heat transfer medium includes cooling pipes, arranged so that water flows therethrough.

* * * * *